Patented Oct. 16, 1951

2,571,740

UNITED STATES PATENT OFFICE 2,571,740

PREPARATION OF AROMATIC DISULFIDES

Harry W. Marson, Greenwich, Conn., assignor to American Cyanamid Company, New York, N. Y., a corporation of Maine No Drawing. Application June 11, 1949, Serial No. 98,633

8 Claims. (Cl. 260—608)

The present invention relates to the preparation of aromatic disulfides. More particularly, it relates to the preparation of bis(meta-nitrophenyl) disulfide. This application is a continuation-in-part of my application, Serial Number 769,325, now abandoned, filed August 18, 1947.

Aromatic disulfides have been prepared in the past, for instance, by adding diazotized solution of a substituted aniline to hot potassium ethyl xanthate and decomposing the resulting oily xanthate with hot alkali to give a substituted thiophenol which is then oxidized to a diphenyl disulfide. The disadvantages of this method are that a number of steps are involved and one of the intermediate compounds is explosive in nature.

Diphenyl disulfides have also been prepared by reacting a substituted chlorobenzene with sodium disulfide. This method requires an activating group, such as a nitro group, in the ortho or para position. The method, therefore, is not suitable for preparing some of the compounds of the present invention wherein a nitro group in the meta position does not sufficiently activate the reaction.

In the J. Chem. Soc. 125, page 2361 (1924) Bere et al. describes the preparation of acetanilide-para-sulphinic acid by reacting acetanilide-para-sulfonyl chloride with a weakly alkaline solution of sodium sulphite followed by the cautious addition of sulfuric acid. The sulphinic acid was heated with hydriodic acid and an excess of sulphurous acid followed by neutralization with sodium carbonate and the product obtained was acetanilide-para-disulphoxide. The disulphoxide was reduced by heating a concentrated solution in acetic acid for 2 hours at 100° with hydrogen iodide and excess of sulphurous acid. The product, isolated by addition of water, was beta-acetanilide-para-disulphide. This method of preparing disulphides involves a number of steps and the use of the expensive reagent hydriodic acid in two separate steps. The process is commercially uneconomical.

I have now found that bis(meta-nitrophenyl)-disulfide can be obtained economically and in good yields by using a relatively small amount of hydriodic acid, iodine or an alkali metal iodide in the presence of cheap reducing agents. These reducing agents act to regenerate the hydriodic acid as fast as the hydrogen is taken up in the reaction and iodine liberated. The reducing agents which I can use in the present process are those which in general will reduce iodine to hydriodic acid without reducing the nitro group present on the benzene nucleus, particularly the acid sulfites having the radical $HSO_3^-$ and the bisulfite salts thereof as sodium bisulfite, potassium bisulfite, ammonium bisulfite, sodium metabisulfite, potassium metabisulfite, and other substances yielding the acid sulfite radical $HSO_3^-$. The $HSO_3^-$ radical may be obtained by dissolving the acid sulfites listed above in water or formed in situ by adding sulfur dioxide to the reaction medium containing water. The latter method being particularly useful in the commercial production of the compounds of the present invention. It is preferable to carry out the reaction in the presence of a small amount of hydriodic acid and an excess of the reducing agent although iodine or an alkali meta iodide can be used in place of hydriodic acid as shown in the examples which follow.

In carrying out the reaction of the present invention I can use from 0.01 mole to 1 mole of iodine or its equivalent for each mole of intermediate. Similarly, I can use from 2.5 moles to 10.0 moles of sulfite, bisulfite or metabisulfite for each mole of intermediate. However, when using a metabisulfite, I prefer to use from 2½ to 3½ moles since one mole of this reagent has twice the sulfur dioxide equivalence of the other reagents.

The compound of the present invention is preferably prepared by suspending the meta-nitrobenzenesulfonyl chloride in a solvent such as water, dioxane, acetic acid, acetone and other ketones such as methyl ethyl ketone or mixtures of such solvents, in the presence of a small amount of hydriodic acid, iodine, or alkali metal iodide. A reducing agent such as hereinbefore described is added at a rate sufficient to decolorize the iodine solution and convert the free iodine into hydriodic acid. The reaction is complete when the sum of the amount of hydriodic acid and reducing agent for the theoretical reduction to the disulfide is added and the color of iodine is completely discharged from the reaction mixture by the addition of a slight excess of reducing agent.

The reaction can be carried out at a temperature of from about 20° C. to about 100° C. However, I prefer to carry out the reaction at a temperature of from about 40° C. to 80° C. The reaction is usually complete in from 15 minutes to 4 hours.

My invention will now be described in greater particularity by means of the following examples showing the preparation of bis(meta-nitrophenyl)disulfide under varying conditions.

Example 1

A mixture of 32.1 g. (0.145 mole) of meta-nitrobenzenesulfonyl chloride, 21.5 g. (0.079 mole) of 47% hydriodic acid, and 53 cc. of water was warmed with stirring to 50° C. Then 35.8 g. of sodium metabisulfite (0.364 mole as $SO_2$) was added in small portions as required to decolorize the iodine solution. The temperature was raised to 65°–70° C. to obtain a satisfactory rate of formation of $I_2$. When the sum of the amount of hydriodic acid and bisulfite added was theoretical for the reduction of disulfide, the mixture was allowed to cool to room temperature with continued stirring and the remainder of the bisulfite was added. When the color of iodine was completely discharged the reaction mixture was chilled and filtered. The product was dried at 60° C. overnight. A yield of 20.8 g. (93%) of bis(meta-nitrophenyl)disulfide was obtained. The produce melted at 83.5°–84.5° C.

Example 2

44.3 g. (0.2 mole) of meta-nitrobenzenesulfonyl chloride
10.9 g. (0.04 mole) of 47% hydriodic acid
85 cc. of water
49.3 g. (0.5 mole) of sodium metabisulfite The reaction was carried out essentially as in Example 1, except that the temperature was raised to 80°–90° C. No more iodine color was observed after 86% of the bisulfite was added. It was necessary to wash the product well with water to remove a high melting impurity presumably the sulfonic acid. A yield of 24.4 g. (79%) of bis(meta-nitrophenyl)disulfide was obtained having the same melting point as the product of Example 1.

Example 3

To a suspension of 11.1 g. (0.05 mole) of meta-nitrobenzenesulfonyl chloride in 20 cc. of water, is added with stirring 3.12 g. (0.0125 mole) of iodine. A small amount of sodium metabisulfite was added. After 5 to 10 minutes the color of iodine appeared and more sodium metabisulfite was added to decolorize the iodine as it formed. When required the temperature was raised to about 50° C. to raise the rate of formation of iodine and this was titrated until a total of 12.3 g. (0.125 mole of $SO_2$) of sodium metabisulfite had been added and the color of iodine has appeared. The reaction mixture was allowed to return to room temperature and 1.23 g. (0.0125 mole of $SO_2$) of sodium bisulfite was added and the mixture was stirred until the dark oil became lighter in color and crystallized. The suspension was then ground with excess sodium bisulfite and allowed to stand overnight to remove completely any iodine remaining in the product. The product was dried at 60° C. and recrystallized from acetone. A yield of 6.2 g. (81%) of bis(meta-nitrophenyl)disulfide was obtained which melted at 81.0° C. to 82.0° C.

Example 4

5,540 g. (25 moles) of meta-nitrobenzenesulfonyl chloride
4,200 g. of glacial acetic acid
6,875 g. (34.3 moles) of sodium metabisulfite
42 g. of potassium iodide
1,630 g. of water A 12 liter, three necked flask was placed on a steam bath and equipped with stirrer, thermometer and reflux condenser. The meta-nitrobenzenesulfonyl chloride was placed in the flask, 3,600 cc. of acetic acid was added and the mixture was stirred and heated to dissolve the acid chloride. To this was added 500 g. of activated charcoal and the mixture stirred one hour at 50° C., after which it was filtered. The filter cake was washed with 400 cc. of acetic acid, and the filtrate and washings transferred to a reaction flask. The potassium iodide was added to the stirred solution and water was added until a precipitate had just started to form (510 cc. of water). The temperature was then raised to 40° C. and the addition of the sodium metabisulfite started. The bisulfite was added slowly and after 11.6% of the bisulfite had been added, the temperature in the flask reached 70° C. and it was held at about this temperature by the exothermic nature of the reaction. The temperature was held down when necessary by running water over the walls of the flask. The evolution of sulphur dioxide was quite apparent during the reaction. As the bisulfite was added the mixture gradually thickened and the rest of the water (1120 cc.) was added intermittently to thin the slurry. The slurry had a tendency to foam so that the rate of feed of the solid bisulfite had to be slowed down. Upon completion of the addition the reaction mixture was stirred for 45 minutes at 80° C. and then left to cool overnight. The product was filtered from the cold acetic acid and the filter cakes reslurried twice in two gallons of water. The yellow-brown solid, bis(meta-nitrophenyl)disulfide was air dried for three days, yielding 2.45 kg. representing a yield of 63.7%. A second similar run yielded 3.03 kg. of product, representing 75.7% yield.

Example 5

A mixture of 154 g. (0.70 mole) of meta-nitrophenylsulfonyl chloride, 57.8 g. (0.35 mole) of potassium iodide and 185 cc. of water was warmed to 50° C. A stream of sulfur dioxide was passed into the mixture to reduce the iodine formed. At the point of maximum reaction the temperature rose spontaneously to 80° C. The reaction mixture was made alkaline with sodium hydroxide solution, filtered and recrystallized from acetone. A yield of 76.3 g. (71%) of bis-meta-nitrophenyl)disulfide was obtained.

Example 6

A mixture of 110.8 g. (0.5 mole) of meta-nitrophenylsulfonyl chloride, 4.15 g. (0.25 mole) of potassium iodide and 135 cc. of water was warmed to 55° C. and the iodine as formed was decolorized with 163 g. (1.29 moles) of sodium sulfite. The mixture was warmed to 70° C. to complete the reaction. The product was pulverized and resuspended in the reaction mixture. The suspension was filtered, washed well with water and dried at 45° C. Yield, 60 g. (78%).

Example 7

A mixture of 238 g. (1.07 mole) of meta-nitrophenylsulfonyl chloride, 146.3 g. (0.535 mole) of 47% hydriodic acid and 290 cc. of water was stirred and the iodine decolorized as formed with 262 g. (2.70 moles) of sulfur dioxide) of sodium metabisulfite. The product was pulverized as a suspension in fresh sodium metabisulfite solution, filtered and dried at 50° C. Yield 148 g. (96%) of bis(meta-nitrophenyl)disulfide, melting at 83.5°–84° C.

*Example 8*

A mixture of 221.6 g. (1.0 mole) of meta-nitrobenzenesulfonyl chloride, 8.3 g. (0.05 mole) of potassium iodide, 4 cc. of concentrated hydrochloric acid solution, 280 cc. of dioxane and half of 63 cc. (3.5 moles) of water was warmed to 50° C. and 248 g. (1.30 moles) of sodium metabisulfite was added at a rate to keep the temperature at 70°–80° C. without further external heating. The remainder of the water was added at about the midpoint of the bisulfite addition. The reaction was completed by warming to 75° C. for 30 minutes. The crude product was washed with water and a small amount of dioxane. The main filtrate and 33 cc. of wash water was used with 221.6 g. (1.0 mole) of meta-nitrobenzenesulfonyl chloride and 248 g. (1.30 moles) of sodium metabisulfite for a second reduction without addition of more iodide. This process was extended until a series of four runs of the same size had been made with the original 8.3 g. of potassium iodide only. An average yield of 94% was obtained without a diminishing return in the series.

*Example 9*

Another reaction was carried out essentially as in Example 8 using 221.6 g. (1.0 mole) of meta-nitrobenzenesulfonyl chloride, 1.66 g. (0.01 mole) of potassium iodide, 63 cc. (3.50 moles) of water, 280 cc. of methyl ethyl ketone and 248 g. (1.30 moles) of sodium metabisulfite. The reaction was completed at a temperature of 66°–75° C. Yield 143.7 g. (93%).

*Example 10*

Another reaction was carried out as in Example 1 using 221.5 g. (1.0 mole) of meta-nitrobenzenesulfonyl chloride, 33.2 g. (0.20 mole) of potassium iodide, 238 g. (1.25 moles) of sodium metabisulfite and 270 cc. of water. The temperature was allowed to climb to 100° C. and 50 g. more of metabisulfite was added to decolorize the product. By reusing the filtrates without the addition of more iodide, a series of four reactions were carried out with yields respectively of 76%, 88%, 87% and 85% of bis(meta-nitrophenyl)disulfide of good quality.

I claim:

1. A method of preparing bis(meta-nitrophenyl)disulfide which comprises mixing together and allowing to react a member of the group consisting of iodine, an alkali metal iodide and hydriodic acid and meta-nitrobenzenesulfonyl chloride, in the presence of water and an inert organic solvent containing a reducing agent selected from the class consisting of sulfur dioxide, alkali metal and ammonium sulfites, bisulfites and metabisulfites.

2. A method of preparing bis(meta-nitrophenyl)disulfide which comprises mixing together and allowing to react from 0.01 mole to 1.0 mole of a member of the group consisting of iodine, an alkali metal iodide and hydriodic acid, from 2.5 moles to 10.0 moles of a reducing agent selected from the class consisting of sulfur dioxide, alkali metal and ammonium sulfites, bisulfites and metabisulfites and one mole of meta-nitrobenzenesulfonyl chloride in the presence of a substantially aqueous solvent and recovering the bis(meta-nitrophenyl)disulfide therefrom.

3. A method of preparing bis(meta-nitrophenyl)disulfide which comprises mixing together and allowing to react meta-nitrobenzenesulfonyl chloride, hydriodic acid and an alkali metal metabisulfite in the presence of a substantially aqueous solvent.

4. A method of preparing bis(meta-nitrophenyl)disulfide which comprises mixing together and allowing to react meta-nitrobenzenesulfonyl chloride, potassium iodide and an alkali metal metabisulfite in the presence of an aqueous-acetic acid solvent.

5. A method of preparing bis(meta-nitrophenyl)disulfide which comprises mixing together and allowing to react meta-nitrobenzenesulfonyl chloride, potassium iodide and sulfur dioxide in a substantially aqueous solvent.

6. A method of preparing bis(meta-nitrophenyl)disulfide which comprises mixing together and allowing to react meta-nitrobenzenesulfonyl chloride, hydriodic acid and sodium metabisulfite in the presence of a substantially aqueous solvent.

7. A method of preparing bis(meta-nitrophenyl)disulfide which comprises mixing together and allowing to react meta-nitrobenzenesulfonyl chloride, potassium iodide and sodium metabisulfite in the presence of an aqueous-acetic acid solvent.

8. In a process of preparing bis-(meta-nitrophenyl)-disulfide by the reduction of meta-nitrobenzenesulfonyl chloride with a source of iodide ion in the presence of water and an inert organic solvent the improvement which comprises the step of reacting meta-nitrobenzenesulfonyl chloride with less than the theoretical amount of a member of the group consisting of iodine, an alkali metal iodide and hydriodic acid and a reducing agent selected from the class consisting of sulfur dioxide, alkali metal and ammonium sulfites, bisulfites and metabisulfites.

HARRY W. MARSON.

REFERENCES CITED

The following references are of record in the file of this patent:

Kohlhase: J. Am. Chem. Soc., vol. 54 (1932), pages 2445–6.

Bere et al.: J. Chem. Soc. (London), vol. 125 (1924), page 2361.

Cleve: "Ber. deut. chem.," vol. 20 (1887), page 1534.

Cleve: "Ber. deut. chem.," vol. 21 (1888), page 1100.